US009288128B1

(12) United States Patent
Palacios et al.

(10) Patent No.: US 9,288,128 B1
(45) Date of Patent: Mar. 15, 2016

(54) EMBEDDING NETWORK MEASUREMENTS WITHIN MULTIPLEXING SESSION LAYERS

(71) Applicant: Google Inc., Mountain View, CA (US)

(72) Inventors: Gonzalo Palacios, Santa Clara, CA (US); Edward Thomas Lingham Hardie, Redwood City, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/838,094

(22) Filed: Mar. 15, 2013

(51) Int. Cl.
*G06F 15/173* (2006.01)
*H04L 12/26* (2006.01)
*H04L 29/06* (2006.01)

(52) U.S. Cl.
CPC ........ *H04L 43/0888* (2013.01); *H04L 43/0841* (2013.01); *H04L 65/601* (2013.01)

(58) Field of Classification Search
CPC ... H04L 29/08072; H04L 29/06; H04L 43/00; H04L 12/2602
USPC .......................................................... 709/224
See application file for complete search history.

(56) References Cited

U.S. PATENT DOCUMENTS

| | | | | |
|---|---|---|---|---|
| 6,868,069 B2* | 3/2005 | Knobbe et al. | ................. | 370/252 |
| 7,002,993 B1* | 2/2006 | Mohaban et al. | ............. | 370/471 |
| 7,437,450 B1* | 10/2008 | Gore et al. | ..................... | 709/224 |
| 7,685,270 B1* | 3/2010 | Vermeulen | .......... | G06Q 30/0603 370/252 |
| 7,961,637 B2* | 6/2011 | McBeath | ....................... | 370/252 |
| 8,000,251 B2* | 8/2011 | Epps | ................... | H04L 41/5009 370/241 |
| 8,189,487 B1* | 5/2012 | Mateski et al. | ................ | 370/242 |
| 8,315,275 B2* | 11/2012 | Nag | ............... | 370/468 |
| 8,566,441 B2* | 10/2013 | Agarwal | ............ | H04L 43/0852 370/252 |
| 8,711,708 B2* | 4/2014 | Wallman | ................. | H04L 69/22 370/236.2 |
| 8,792,380 B2* | 7/2014 | Hansson | ................ | H04J 3/0667 370/252 |
| 8,804,762 B2* | 8/2014 | Thompson | ............ | H04J 3/0697 370/389 |
| 8,811,410 B1* | 8/2014 | Jain et al. | ................. | 370/395.62 |
| 8,830,860 B2* | 9/2014 | Robitaille | ........... | H04L 43/0852 370/252 |
| 2001/0050903 A1* | 12/2001 | Vanlint | ..................... | H04L 1/24 370/252 |
| 2002/0120727 A1* | 8/2002 | Curley | .................... | H04L 41/12 709/223 |
| 2006/0056298 A1* | 3/2006 | Nag et al. | ...................... | 370/230 |
| 2006/0285509 A1* | 12/2006 | Asplund | ........................ | 370/312 |
| 2007/0274227 A1* | 11/2007 | Rauscher | ............ | H04L 12/2697 370/252 |
| 2008/0049633 A1* | 2/2008 | Edwards | ............. | H04L 43/0852 370/252 |
| 2010/0265832 A1* | 10/2010 | Bajpay | ................ | H04L 41/0631 370/250 |
| 2013/0297814 A1* | 11/2013 | Annamalaisami et al. | ... | 709/230 |
| 2014/0006610 A1* | 1/2014 | Formby et al. | ................ | 709/224 |
| 2014/0149605 A1* | 5/2014 | Annamalaisami et al. | ... | 709/247 |

* cited by examiner

*Primary Examiner* — Joseph E Avellino
*Assistant Examiner* — Binod J Kunwar
(74) *Attorney, Agent, or Firm* — Edward A. Gordon; Foley & Lardner LLP

(57) ABSTRACT

Exemplary embodiments provide techniques for measuring network latency attributable to the transit of packets through the network. This may be accomplished by developing a common sense of time with the server that allows packet inter-arrival times to be accurately measured. In establishing the common time between the client and the server, it may be necessary to overcome network topology manipulations and/or packet pacing manipulations performed by an intermediate device. Accordingly, an end-to-end multiplexing protocol may be employed which allows a protected connection to be established from the client directly to the server, bypassing the manipulations. Using the multiplexing protocol, a timing flow may be established for carrying timing traffic. After trading timing traffic with the server for a period of time, the client may establish a common or shared sense of time with the server which may be used to measure the latency in the network.

22 Claims, 4 Drawing Sheets

EMBEDDING NETWORK MEASUREMENTS WITHIN MULTIPLEXING SESSION LAYERS

BACKGROUND

An application, such as a web browser, may communicate over the Internet or another network in order to send and receive information to a server or other device. When the application requests that an action be taken (e.g., requests a web page), the application may experience delay, known as "latency." This latency may be due to a number of causes, such as a delay at the back-end server in processing requests from the application, or network delay in the transmission of requests and responses to and from the application.

Users and network administrators may wish to measure how much application latency is attributable to network delay (and to distinguish network delay from application delay). One technique for measuring network latency is to measure the round-trip-time of a request/acknowledgment in the network. A client may send a request and await an acknowledgment that the request has been received. Upon receiving the acknowledgment, the client may compare the receipt time for the acknowledgment to the sending time of the request to determine a round-trip-time of the request from the client to the requestee. If the round-trip time of subsequent requests increases (or decreases), this change may be assumed to be attributable to a change in the network latency.

The acknowledgment may differ from a response to the request. For example, in an HTTP scenario, an HTTP request may be generated, and an HTTP response may be sent back. Upon receiving the initial HTTP request, the requestee may immediately send an acknowledgment, then may process the request and send a response. The round trip time of the request/response is typically a poor measure of network latency, since this measure also includes the amount of time that it took to generate a response to the request. The round trip time of the request/acknowledgment may be a better measure, since the acknowledgment is typically returned form the requestee right way. Furthermore, in some networks, a separate timing flow may also be used in an attempt to gauge network latency. The timing flow may include special timing packets with timestamp data that allows the travel time of packets in the network to be measured.

However, both request/acknowledgment round trip measurement and timing flows may not provide an accurate measurement of network latency due to the presence of intermediate interception proxies in the network which serve as false endpoints. An interception proxy may intercept a request from the client and imitate the requestee. The interception proxy may manipulate the rate at which acknowledgment receipts are sent to the client on behalf of the requestee. Thus, the round-trip time observed by the client may not be an accurate representation of the amount of time that a request/acknowledgment spend transiting the network.

Interception proxies are commonly used for a number of purposes. For example, WAN accelerators may intercept traffic associated with a Wide Area Network and may perform WAN optimizations, such as compression, caching, and latency optimizations. Furthermore, application-specific interception proxies, such as HTTP interception proxies, may also be used to provide targeted improvements to applications or protocols of the network.

SUMMARY

Exemplary embodiments provide techniques for accurately measuring network latency using a timing protocol (such as Network Time Protocol, or "NTP") within one of the streams of a multiplexing protocol (such as SPDY). The multiplexing protocol may provide an end-to-end transport-layer connection between the client and the server. Thus, measurement traffic may be embedded into an existing, long-lived network flow. This measurement traffic may be used, for example, to distinguish network latency from other types of latency.

More specifically, the multiplexing protocol may operate at the transport layer of the network. Because the multiplexing protocol can provide an end-to-end connection between the client and the server (which is preferably cryptographically protected to further avoid intermediate false endpoints), other devices on the network are unable to manipulate the network topology or rate of response as seen by the client.

Further, because the multiplexing protocol allows for multiplexing, some network traffic may be injected over the multiplexing protocol in the form of packets employing the timing protocol. These timing packets can be used to develop an accurate shared sense of time between the client and the server. Based on this shared sense of time, packet inter-arrival times may be used to calculate the latency of the network.

Still further, because a protocol such as SPDY is relatively long lived (as compared to a protocol such as HTTP), measurements can be taken over a period of time to gain a realistic understanding of the behavior of the network.

According to an exemplary embodiment, a connection to a remote device may be initiated using a multiplexing protocol. The multiplexing protocol may provide an end-to-end connection with the remote device. A timing flow may be initiated over the multiplexing protocol. The timing flow may be associated with a timing protocol. Timing data may be sent over the timing flow to establish a shared frame of reference. For example, a real time or an arbitrary synchronized time may be calculated, where the real time or the arbitrary synchronized time is shared with the remote device. Based on the shared frame of reference, a network latency may be calculated.

According to another embodiment, an electronic device may communicate with a server over a network. The network may include an intermediate device that engages in network topology manipulation or transport-layer packet manipulation.

A timing flow associated with a timing protocol may be accessed by the electronic device. The timing flow may be transmitted through a multiplexing protocol by which the electronic device is connected to the server. The transmission may occur in a manner that ignores the network topology manipulation or packet manipulation of the intermediate device. One or more timing packets may be transmitted over the timing flow. The inter-arrival times of one or more of the timing packets and one or more response packets from the server may be measured. Based on the measured inter-arrival times, a network latency may be calculated.

Furthermore, the inter-arrival times may be compared to TCP-level round-trip times (e.g., TCP-level response/acknowledgment) times. If the inter-arrival times and the TCP-level round-trip times are different by more than a predetermined amount, this may signify that an intermediate device is manipulating the network topology or TCP-level acknowledgments. Thus, the existence of such an intermediate device may be detected.

The multiplexing protocol may exist at a different level of the network than the TCP-level. Thus, even if the intermediate device manipulates TCP-level acknowledgments (and thus measurements based on TCP-level acknowledgments), the multiplexing protocol and its streams are not affected.

According to another embodiment, a connection to a server may be initiated using a multiplexing protocol. The multiplexing protocol may provide an end-to-end connection with the server. A timing flow may be initiated over the multiplexing protocol, where the timing flow is associated with a timing protocol. A plurality of network packets may be sent over the timing flow over a period of time, and the end-to-end connection to the server may be maintained for the duration of the period of time. A network latency may be calculated over the period of time based on acknowledgements to the network packets received from the server.

DETAILED DESCRIPTION

Exemplary embodiments provide techniques for measuring network latency attributable to the transit of packets through the network (and for distinguishing between, for example, network latency and processing delays attributable to a back-end server). This effect may be accomplished by developing a shared sense of time with the server that allows packet inter-arrival times to be accurately measured.

In establishing the shared sense of time between the client and the server, it may be necessary to overcome network topology manipulations and/or packet pacing manipulations performed by an intermediate device. This may be achieved by employing an end-to-end multiplexing protocol which allows a (potentially cryptographically protected) connection to be established from the client directly to the server, bypassing the intermediate device. An example of a protocol which is capable of performing this functionality is SPDY. Because SPDY is a session-layer protocol that sits above Transmission Control Protocol (TCP), and because intermediate devices typically manipulate acknowledgements at the TCP level, an SPDY connection is able to ignore the forged ACKs from the intermediate device.

Using the multiplexing protocol, a timing flow may be established for carrying timing traffic (e.g., Network Timing Protocol, or "NTP," packets). After trading timing traffic with the server for a period of time, the client may be able to establish a common or shared sense of time with the server which may be used to measure the latency in the network.

More specifically, in conventional latency calculation schemes, such as those discussed in the Background section above, an accurate sense of network delay may be difficult or impossible to achieve due to the presence of certain intermediate devices on the network.

Figure 1:
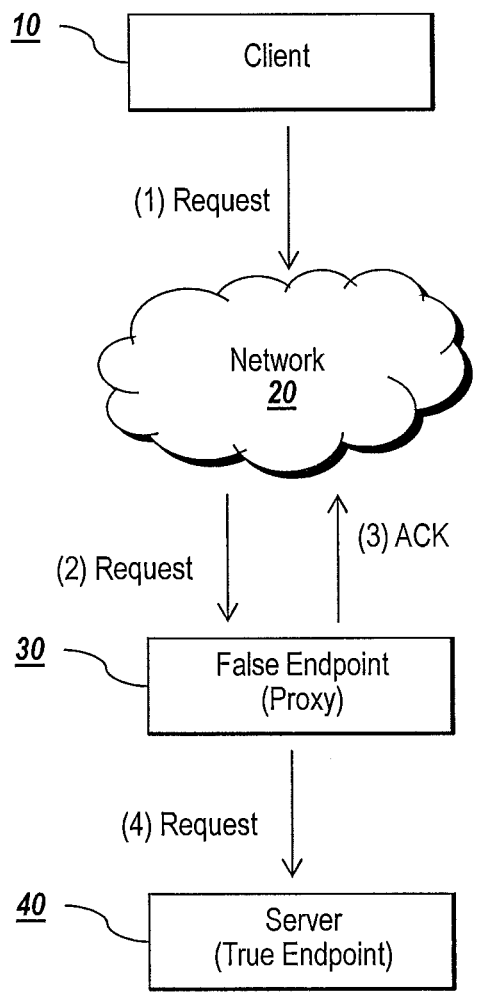
FIG. 1 depicts an exemplary network including a client, a server, and a proxy serving as a false endpoint for communication from the client to the server.

For example, as shown in FIG. 1, the network 20 may employ a proxy device 30 that is positioned between a client 10 and a server 20. This proxy 30 may be used for several reasons. For example, a LAN or WAN accelerator may be used to manipulate the rate at which the client 10 sends requests to the server 20.

This manipulation may be achieved by intercepting client requests and controlling a rate of acknowledgement of those requests (in the form of an acknowledgement receipt, or "ACK"). If the proxy 30 wishes the client 10 to send requests at a slower rate, the proxy 30 may withhold acknowledgement receipts for a period of time. Because a client 10 typically waits for an acknowledgment that a certain amount of data has been successfully received before transmitting additional data, manipulating the rate of acknowledgements can cause the client 10 to send data faster or slower than the client otherwise would have.

Such a network configuration causes several problems in determining network latency.

For example, in one technique for measuring network latency, the client may measure the inter-arrival time that elapses between when a request is sent to the server 40 and when an acknowledgement receipt is received for the request. The client 10 typically assumes that the server 40 receives the packet and immediately sends an acknowledgement receipt. Accordingly, inter-arrival time between when the packet is sent and the receipt is received is understood to represent the amount of time that it takes for a packet to make a single round-trip of the network. If the round-trip time increases, then the client 10 may assume that the increased travel time is due to latency. Because a packet is understood to be acknowledged immediately (i.e., the request is acknowledged before the request is processed), changes in the round trip time must be due to network latency and not a delay in processing the request at the server 40.

However, many real-world networks 20 employ the above-described proxies and other false endpoints 30. Because the rate at which acknowledgements are sent back to the client may be manipulated by the proxy 30, the round-trip-time of a request/ACK may not be an accurate representation of the network latency. Thus, the client 10 may be unable to accurately determine the round-trip-time, and thus receives a false sense of latency in the network.

Furthermore, the proxy provides a false endpoint to requests by the client, and as a result the client is unable to obtain an accurate view of the network topology. For example, the client may believe, based on the routing of data to the proxy 30 and the acknowledgement received from the proxy 30, that the server 40 is at the location of the proxy 30. In reality, many network links may exist between the proxy 30 and the server 40, so the client's sense of the network distance between the client 10 and the server 40 may be skewed.

Still further, hypertext transport protocol (HTTP) is commonly used as a transport protocol for sending information in a network. However, HTTP connections are typically established for only a short period of time (e.g., the connection may exist only for a particular response and request to the response), and moreover are typically associated with a specific destination. Accordingly, if HTTP is used in an attempt to measure latency in the network, the short-lived nature of an HTTP connection may make it difficult or impractical to measure network latency accurately and over a period of time, especially when the defined destination routes the HTTP request to a proxy 30.

Figure 2:
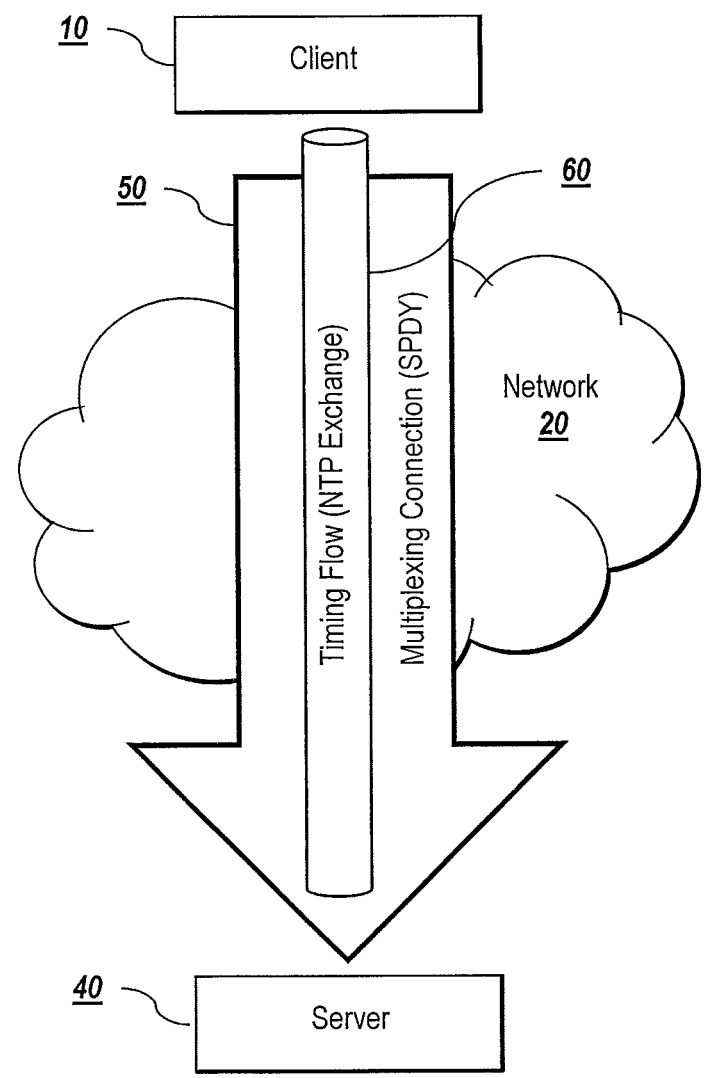
FIG. 2 depicts an exemplary setup for accurately measuring network latency between the client and the server.

An exemplary embodiment of a solution to this problem is depicted in FIG. 2. As shown in FIG. 2, a multiplexing connection 50 may be established between the client 10 and the server 40. The multiplexing connection 50 may be an end-to-end (e.g., client-to-server) connection. Because the multiplexing connection 50 may be end-to-end, the multiplexing connection may avoid network or packet manipulations by intermediate devices in the network 20.

In some embodiments, the multiplexing connection 50 may be cryptographically protected, thus providing additional protection against the intermediate devices. Because a cryptographically protected connection is generally secured against manipulation from outside devices, a cryptographically protected connection between the client and the server may provide additional assurances that intermediate devices have not manipulated the connection.

One example of a multiplexing protocol suitable for use with exemplary embodiments is SPDY. SPDY is a replacement session layer for web applications. SPDY provides a Transport Layer Security (TLS)-protected method to multiplex multiple Hypertext Transport Protocol (HTTP) requests/responses over a single Transmission Connection Protocol (TCP) flow. Because SPDY permits multiplexing, a small amount of measurement traffic in the form of a timing flow 60 may be added to a SPDY connection between a client and server. The measurement traffic may be used to develop a picture of the overall network latency between the client and the server.

Furthermore, a SPDY connection need not be torn down and re-established for each new request/response. Because a SPDY connection is long-lived compared to HTTP, measurement traffic embedded in SPDY can be used to create a realistic baseline understanding of the latency between client and server and an ongoing view of connection jitter.

Because SPDY works as a session layer protocol above TCP, the use of an SPDY connection allows for the detection of network latency which might be hidden by proxy acknowledgement of TCP packets. Because an exemplary embodiment employing SPDY does not rely on TCP-derived data to determine the network latency, it is protected from such manipulation.

The timing flow 60 may be traffic provided according to a network time protocol ("NTP"). In this case, the initiator of the SPDY exchange may act as an NTP client and the SPDY responder may act as an NTP server. NTP may provide information about offset, delay, dispersion, jitter, and time of arrival of a packet. This information may be used to group the client application and server into a common view of time. This common view of time may be used to measure and report the network conditions (e.g., latency) between client application and server.

As used herein, "common time" refers to a measurement of time which is shared or synchronized between a plurality of applications and/or devices. It should be noted that having a common time does not require that the applications and/or devices actually maintain a synchronized set of clocks. For instance, the applications and/or devices may instead maintain a conversion factor that allows a local system time to be converted to the common time.

More specifically, it is not necessary that the client device running the client application actually have a time source that is synchronized with the server. Rather, the client application may come to a common view of the time for the purposes of latency measurement. In other words, once the client application determines the time as reflected by the server, it is not necessary that the client application actually synchronize the client device's local clock with the server's clock. Rather, the common time may be noted, for example by storing a conversion factor that allows the local client device's clock time to be converted into the time as seen by the server (and/or vice versa). This common time may be distinguished from other NTP-derived clock time by the use of a special era in the NTP exchange. Alternatively, the client application may choose to unite the client device's clock with the server time.

SPDY and NTP are intended to be examples of suitable protocols for use with exemplary embodiments. However, other multiplexing and timing protocols may also be used with exemplary embodiments. For example, it would be possible to generate similar timing measurement traffic without using NTP's specific format. A timing protocol providing timestamps of the packet transmission time and reception time (in order to both determine a baseline and measure packet inter-arrival times) may be sufficient as a timing protocol. Similarly, end-to-end multiplexing protocols that are different than SPDY may be employed.

It is also possible to measure network latency at other network devices (e.g. devices other than the client and server, such as local routers) and then to expose this latency to devices (e.g. using an Application-Layer Traffic Optimization, "ALTO," cost map). Thus, a generalized map may be created and/or published on the network for the use of other devices.

Figure 3:
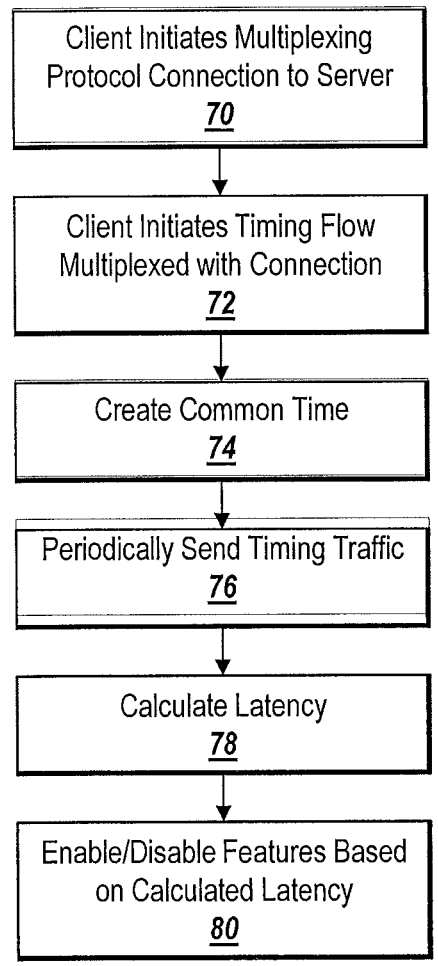
FIG. 3 depicts an exemplary process for accurately measuring network latency between two devices on a network.

Thus, the client and server may come to a common time and may use the common time to measure the latency of the network. FIG. 3 depicts an exemplary procedure for measuring network latency according to an exemplary embodiment.

At step 70, the client may initiate a connection to the server using the multiplexing protocol (e.g., a SPDY connection). If SPDY is used, step 70 may involve creating a TCP connection, then a TLS association, then providing HTTP semantics for the connection. When establishing the TLS association, a series of association packets may be sent between the client and the server.

At step 72, the client may initiate an timing flow between itself and the server, using a channel multiplexed within the multiplexing protocol connection. The timing flow may be provided according to the NTP protocol.

Optionally, the timing flow may be established at a known or predetermined time after a final association packet is received when establishing the multiplexing connection (e.g. 200 milliseconds after the TLS exchange completes). This allows the server to gauge the packet inter-arrival time at the client by measuring the round trip time from the sending of the final association packet to the receipt of a packet initiating the timing flow and accounting for the predetermined time.

At step 74, the client and server may exchange timing-flow-formatted packets over the timing flow. Each timing flow packet may include a time stamp indicating a time at which the packet was sent from the client, and responses from the server may similarly include a time stamp indicating the time at which they were sent from the server. Each timing packet and response pair may be associated with a round-trip time. After a sufficient number of timing packets have been sent, the round-trip times may divided by two to determine a one-way trip time. The one-way trip time may be used to calculate the difference between the client clock and the system clock.

As a simplified example, assume that the client's clock is five milliseconds ahead of the server's, and that the network has a constant latency of one millisecond. The client sends the timing first packet at 0:00:00 (at which time the server's clock reads 0:00:05). The first packet arrives at the server at 0:00:01 (according to the client; the server believes the time is 0:00:06). The server immediately responds with a response packet and timestamps the response packet with the local server time (0:00:06). This packet takes one millisecond to transit the network and is received by the client at 0:00:02.

The client sees that the timing packet/response pair took 2 milliseconds to transit the network, and therefore determines that the one-way trip time between the client and server is one millisecond. Accordingly, the server must have received the packet one millisecond after the client sent it at 0:00:00 (local client time), making the time of receipt 0:00:01 (local client time). Because the time stamp states that the server clock reflected a server time of 0:00:06 at this time, the client determines that there is a five-millisecond difference between the client and the server. This allows the client to come to a shared sense of time with the server.

In practice, the latency in the network is seldom constant. Accordingly, this process may be repeated for a number of packets in order to provide a sufficient sample size to determine an average network latency.

At step 76, the client may periodically sends new timing traffic over the timing flow to determine the latency between the client and server.

The amount of time that elapses between sending timing packets may be influenced by the measured jitter, so that a client with a relatively jitter-free connection to the server needs to send only low numbers of NTP packets. Over a stable long-lived connection (e.g. between a client and SPDY proxy), these timing packets may be emitted only after many minutes have passed. For other contexts with relatively high jitter (e.g. cellular wireless), more frequent measurements may be used in order to get obtain up-to-date data.

At step 78, the client may calculate a latency of the network based on the timing traffic. For example, assume the client from the above example sends a new timing packet and measures the round trip time as four seconds. Recall that the originally-measured round-trip time was two seconds. Based on the new timing packet, the client may determine that the network latency has increased from one second (half of the previous round-trip time) to two seconds (half of the new round-trip time).

At step 80, the client may choose to disable certain application features or show user warnings when the calculation of step 78 shows consistently high network latency. For example, in an application providing a predictive text feature, this feature might be disabled in an application where the network latency fell within a predetermined range, such as a user-detectable range. In another example, if the application is capable of receiving data at different resolutions (e.g., a map application that can request maps at high, medium, or low resolution), the resolution requested may be adjusted so that low resolution is requested when network latency is high and high resolution is requested when network latency is low.

Figure 4:
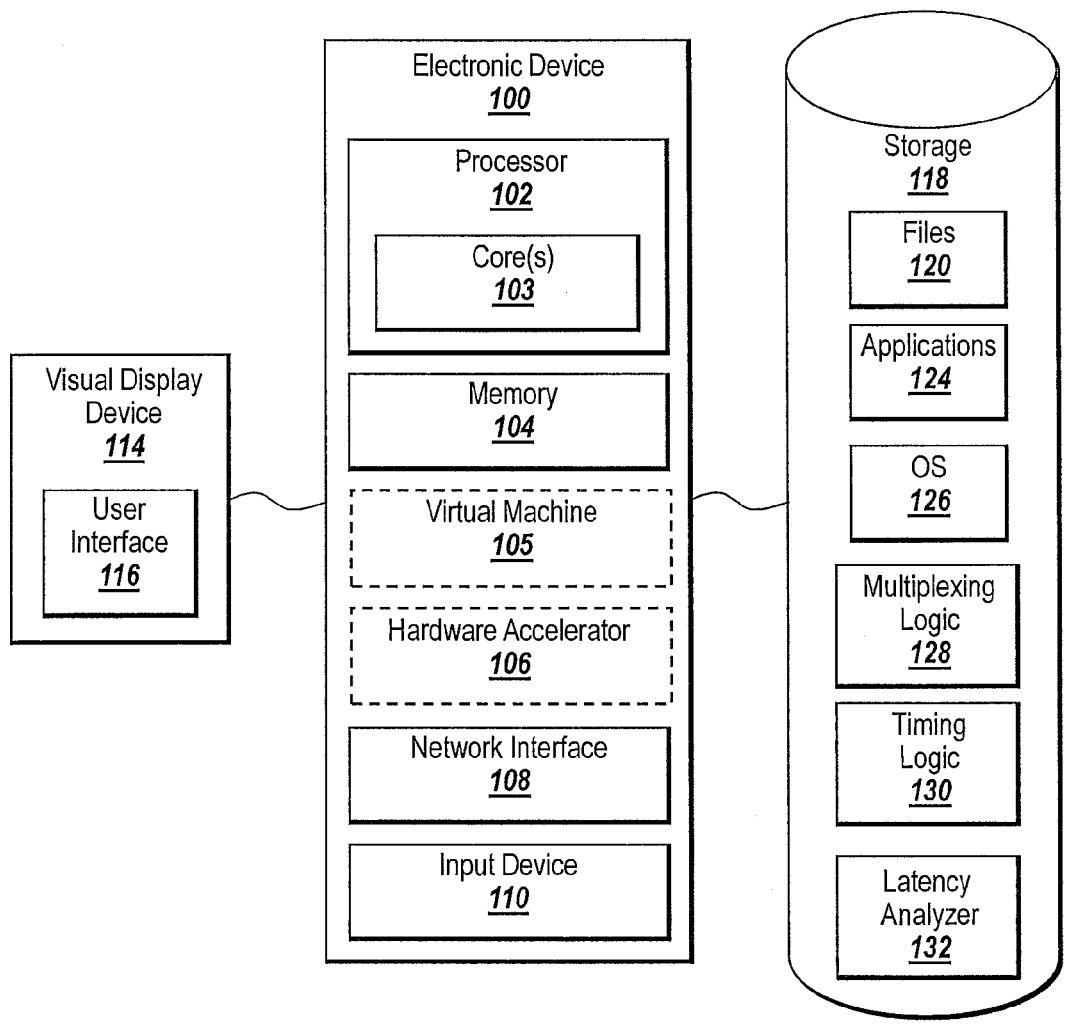
FIG. 4 depicts an exemplary computing device.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 4 depicts an example of an electronic device 100 that may be suitable for use with one or more acts disclosed herein.

The electronic device 100 may take many forms, including but not limited to a computer, workstation, server, network computer, quantum computer, optical computer, Internet appliance, mobile device, a pager, a tablet computer, a smart sensor, application specific processing device, etc.

The electronic device 100 is illustrative and may take other forms. For example, an alternative implementation of the electronic device 100 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, components illustrated in FIG. 1 and/or other figures are not limited to a specific type of logic.

The processor 102 may include hardware based logic or a combination of hardware based logic and software to execute instructions on behalf of the electronic device 100. The processor 102 may include logic that may interpret, execute, and/or otherwise process information contained in, for example, the memory 104. The information may include computer-executable instructions and/or data that may implement one or more embodiments of the invention. The processor 102 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 102 may include a system-on-chip (SoC) or system-in-package (SiP).

The electronic device 100 may include one or more tangible non-transitory computer-readable storage media for storing one or more computer-executable instructions or software that may implement one or more embodiments of the invention. The non-transitory computer-readable storage media may be, for example, the memory 104 or the storage 118. The memory 104 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 100 may include a virtual machine (VM) 105 for executing the instructions loaded in the memory 104. A virtual machine 105 may be provided to handle a process running on multiple processors so that the process may appear to be using only one computing resource rather than multiple computing resources. Virtualization may be employed in the electronic device 100 so that infrastructure and resources in the electronic device may be shared dynamically. Multiple VMs 105 may be resident on a single computing device 100.

A hardware accelerator 106, may be implemented in an ASIC, FPGA, or some other device. The hardware accelerator 106 may be used to reduce the general processing time of the electronic device 100.

The electronic device 100 may include a network interface 108 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 108 may include a built-in network adapter, network interface card, personal computer memory card international association (PCMCIA) network card, card bus network adapter, wireless network adapter, universal serial bus (USB) network adapter, modem or any other device suitable for interfacing the electronic device 100 to any type of network capable of communication and performing the operations described herein.

The electronic device 100 may include one or more input devices 110, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 100 may include other suitable I/O peripherals.

The input devices 110 may allow a user to provide input that is registered on a visual display device 114. A graphical user interface (GUI) 116 may be shown on the display device 114.

A storage device 118 may also be associated with the computer 100. The storage device 118 may be accessible to the processor 102 via an I/O bus. The storage device 118 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 118 may store information in one or more files 120. The information may be executed, interpreted, manipulated, and/or otherwise processed by the processor 102.

The storage device 118 may further store applications 124, and the electronic device 100 can be running an operating system (OS) 126. Examples of OS 126 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 118 may further store multiplexing logic 128. The multiplexing logic 128 may include logic for establishing a connection according to a multiplexing protocol. The multiplexing protocol may be a cryptographically protected end-to-end protocol. For example, the multiplexing logic 126 may include logic for implementing the SPDY protocol.

The storage device 118 may further store timing logic 130. The timing logic 130 may include logic for establishing a connection according to a timing protocol. The timing logic may include logic for measuring packet transmission, receipt, and/or inter-arrival times. For example, the timing logic 130 may include logic for implementing the network timing protocol ("NTP").

The storage device 118 may further store instructions for providing a latency analyzer 132. The instructions may include, for example, instructions for performing a procedure for analyzing the latency of the network such as the procedure depicted in FIG. 3.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic device readable storage medium holding instructions that, when executed, cause a processor to:

initiate a connection to a remote device using a multiplexing protocol, the multiplexing protocol providing an end-to-end connection with the remote device, wherein the multiplexing protocol is a transport-layer or session-layer protocol;

initiate a timing flow over the multiplexing protocol, the timing flow associated with a timing protocol;

send network traffic over the connection, the network traffic including packets for the timing flow and packets for one or more additional flows over the multiplexed end-to-end connection, wherein at least one flow in the one or more additional flows is for an application;

receive, from the remote device, one or more response packets for the timing flow;
calculate an end-to-end network latency based on the one or more response packets; and
control the application responsive to a determination that the calculated end-to-end network latency is within a predetermined range, wherein controlling the application comprises lowering a data resolution when the determined latency is above a predetermined threshold.

2. The medium of claim 1, wherein the multiplexing protocol is SPDY.

3. The medium of claim 1, wherein the multiplexing protocol is cryptographically protected.

4. The medium of claim 1, wherein the timing protocol is an application layer protocol.

5. The medium of claim 1, wherein the timing protocol is Network Time Protocol ("NTP").

6. The medium of claim 1, further holding instructions for:
receiving a final association packet when initiating the connection with the multiplexing protocol;
waiting a predetermined period of time after receiving the final association packet; and
initiating the timing flow upon the predetermined period of time elapsing.

7. A method implemented in an electronic device communicating with a server over a network, the network comprising an intermediate device that engages in network topology manipulation or packet manipulation, the method comprising:
accessing a timing flow associated with a timing protocol, the timing flow transmitted through a multiplexing protocol by which the electronic device is connected to the server in a manner that ignores the network topology manipulation or packet manipulation of the intermediate device, wherein the multiplexing protocol is a transport-layer or session-layer protocol;
transmitting one or more timing packets over the timing flow;
measuring inter-arrival times of the one or more timing packets and one or more response packets from the server;
calculating an end-to-end network latency based on the measured inter-arrival times; and
controlling, responsive to a determination that the calculated end-to-end network latency is within a predetermined range, an application transmitting one or more additional flows over the multiplexed end-to-end connection, wherein controlling the application comprises lowering a data resolution when the determined latency is above a predetermined threshold.

8. The method of claim 7, wherein the multiplexing protocol is SPDY.

9. The method of claim 7, wherein the multiplexing protocol is cryptographically protected.

10. The method of claim 7, wherein the timing protocol is an application layer protocol.

11. The method of claim 7, wherein the timing protocol is Network Time Protocol ("NTP").

12. A system comprising:
a non-transitory computer-readable medium holding instructions; and
a processor configured to execute the instructions to:
initiate a connection to a server using a multiplexing protocol, the multiplexing protocol providing an end-to-end connection with the server, wherein the multiplexing protocol is a transport-layer or session-layer protocol;
initiate a timing flow over the multiplexing protocol, the timing flow associated with a timing protocol;
send network traffic over the multiplexed end-to-end connection over a period time, the network traffic including packets for the timing flow and packets for one or more additional flows, wherein at least one flow in the one or more additional flows is for an application, the end-to-end connection to the server being maintained for the duration of the period of time;
calculate an end-to-end network latency over the period of time based on acknowledgements to the network packets received from the server; and
control the application responsive to a determination that the calculated end-to-end network latency is within a predetermined range, wherein controlling the application comprises lowering a data resolution when the determined latency is above a predetermined threshold.

13. The system of claim 12, wherein the multiplexing protocol is SPDY.

14. The system of claim 12, wherein the multiplexing protocol is cryptographically protected.

15. The system of claim 12, wherein the timing protocol is an application layer protocol.

16. The system of claim 12, wherein the timing protocol is Network Time Protocol ("NTP").

17. The system of claim 12, the instructions further comprising instructions to periodically recalculate the network latency and control the application based on the recalculated network latency.

18. The system of claim 17, wherein the periodic recalculations of network latency are separated by an amount of time adjusted based on jitter between the calculated network latency and the recalculated network latency.

19. The medium of claim 1, further holding instructions for periodically recalculating the network latency and controlling the application based on the recalculated network latency.

20. The medium of claim 19, wherein the periodic recalculations of network latency are separated by an amount of time adjusted based on jitter between the calculated network latency and the recalculated network latency.

21. The method of claim 7, further comprising periodically recalculating the network latency and controlling the application based on the recalculated network latency.

22. The method of claim 21, comprising adjusting an amount of time between the periodic recalculations of network latency based on jitter between the calculated network latency and the recalculated network latency.

* * * * *